Figure 1:
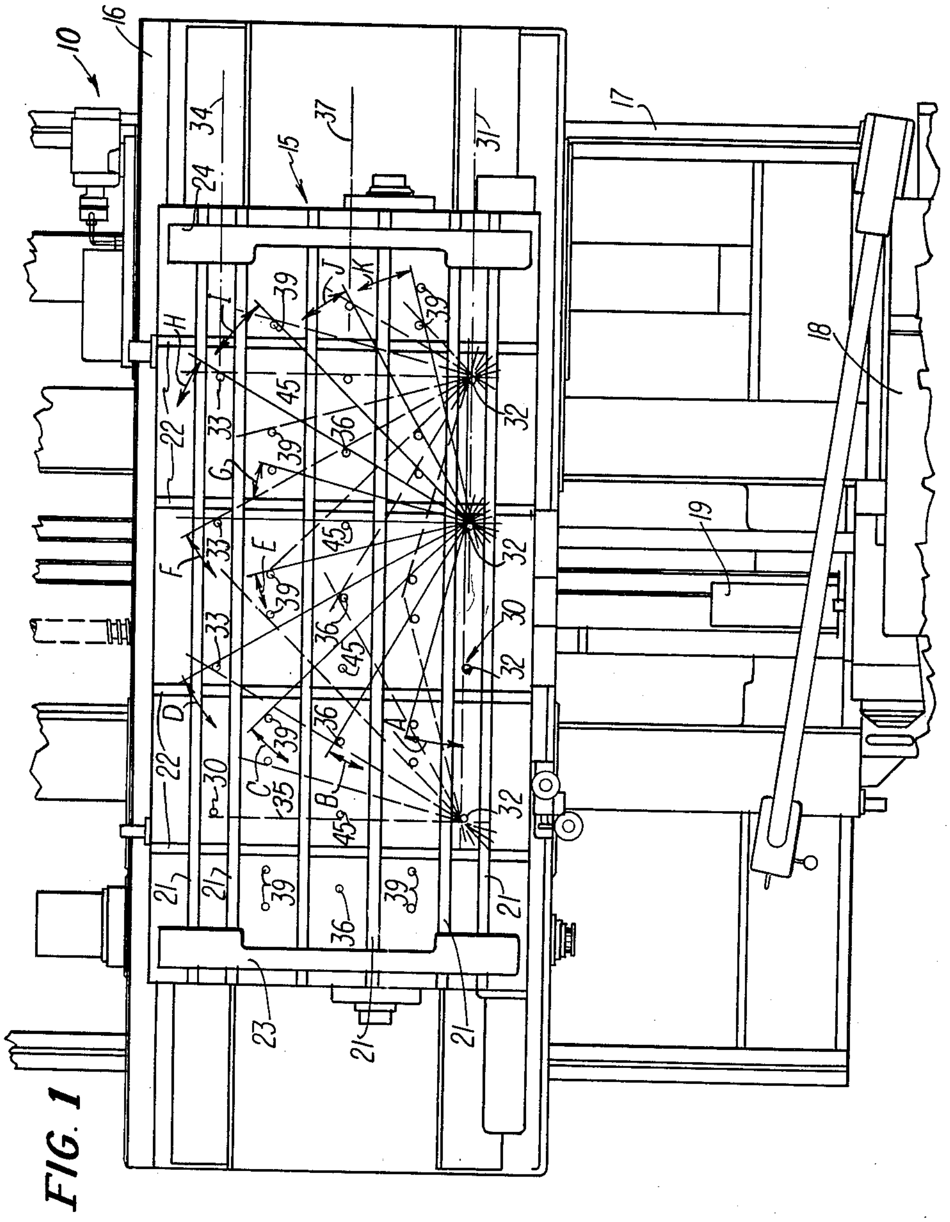

Aug. 14, 1962

E. L. McFERREN 3,049,345

MACHINE TOOL WORK TABLE

Filed May 13, 1960

2 Sheets-Sheet 1

INVENTOR.

Edgar L. McFerren

BY

Wolfe, Hubbard, Voit & Osann

Attys.

Aug. 14, 1962 E. L. McFERREN 3,049,345

MACHINE TOOL WORK TABLE

Filed May 13, 1960 2 Sheets-Sheet 2

INVENTOR.
Edgar L. McFerren
BY
Wolfe, Hubbard, Voit & Osann
Attys.

3,049,345

MACHINE TOOL WORK TABLE

Edgar L. McFerren, Fond du Lac, Wis., assignor to Giddings & Lewis Machine Tool Company, Fond du Lac, Wis., a corporation of Wisconsin Filed May 13, 1960, Ser. No. 28,883
3 Claims. (Cl. 269—9)

The present invention relates to machine tools such as horizontal boring, drilling and milling machines. More particularly, the invention concerns a work piece positioning arrangement for the work table of such machine tools.

Machine tool work tables support the parts to be machined, i.e. work pieces, in proper relationship to the cutting or working tool. It is conventional to clamp or otherwise secure the work pieces to the table during the machining operation.

To aid the operator in positioning the work on the table prior to clamping or securing, it has been conventional to provide the work-supporting surface of the table with stop pins against which the work can be positioned. Such stop pins are usually removably fitted into holes formed in the table surface and it is common practice to provide the table with a pattern of precisely alined holes so that the stop pins can be fitted into alternate ones of the holes. In this way, the machine operator can set up a number of stop pins in the particular arrangement best suited to position the work to be done.

Heretofore, stop pin holes were customarily arranged in checkerboard fashion, that is, in parallel rows of holes alined both longitudinally and transversely of the table and the tool spindle. Hole patterns of this type afford a selection of stop pin rows against which a work piece can be positioned so as to extend either parallel or at right angles to the tool spindle. However, when a different alinement angle is called for, the pins can not be properly located and it is necessary to employ some more complicated positioning apparatus or to rotate the entire table.

Accordingly, it is an object of the invention to provide a novel pattern of stop pin holes for a machine tool table allowing stop pins to be alined not only longitudinally and transversely of the table and tool spindle, but also at any one of a wide choice of commonly used angles.

More specifically, it is an object to provide a stop pin hole pattern of the above character in which a few holes permit alternate pin alinements varying in 15° steps from zero to 180° relative to a base line.

A further object of the invention is to provide a stop pin hole pattern as described above which is repetitive so that a work piece can not only be properly angled with respect to the tool spindle but can also be located at the most convenient point on the table.

It is also an object of the invention to provide a stop pin hole pattern as characterized above which can be easily laid out for a tool table of any desired size.

Another object is to provide a machine tool table with a pattern of stop pin holes having the above advantages with the table being no more expensive to manufacture than a conventional table. More particularly, it is an object to provide a pattern of stop pin holes which can be economically formed since few holes are required and these are located in an easily laid out, repetitive pattern.

Figure 2:
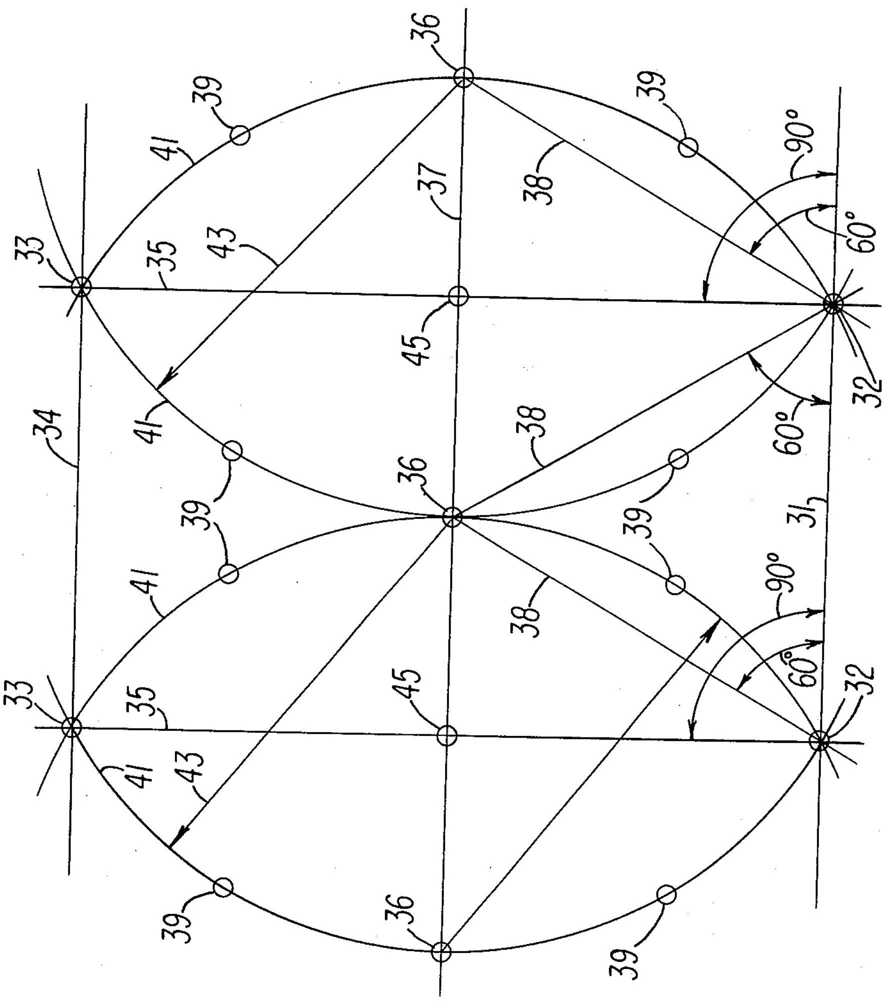

Other objects and advantages of the invention will become apparent upon reading the following detailed description and upon reference to the drawings in which:

FIGURE 1 is a fragmentary plan view of a machine tool having a work table in which the present invention is embodied; and FIG. 2 is an enlarged plan view of the repetitive pattern of the stop pin holes shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is shown a fragment of a horizontal, boring, drilling and milling machine 10 having a work-supporting table 15 embodying the present invention. The table 15 is slidably supported for transverse movement of the machine 10 on a table saddle 16 which in turn is slidably supported for longitudinal movement of the machine on a fixed bed or base 17. At one end of the machine bed 17 is disposed a vertical column member 18 which carries a head stock or main drive spindle 19. As is conventional with tools of this type, the table 15 is adapted to reciprocate on the saddle 16 in a direction transverse to the main drive spindle 19, and the saddle 16 is adapted to slide, and thus carry the table 15, in a direction extending axially of the drive spindle.

For clamping the work onto the table 15, the upper surface of the table is formed with a plurality of T-slots 21 which extend longitudinally of the table. In the illustrated machine, the upper surface of the table 15 is also formed with cross-slots 22 and chip-receiving end depressions 23, 24.

For adjustably establishing reference surfaces against which the work pieces can be positioned, a plurality of stop pin holes 30 into which stop pins can be removably fitted are formed in the upper surface of the table 15. The holes 30 are precisely formed to slideably receive stop pins, not shown, so that the pins will project above the table surface when fitted into the holes. By placing a number of pins in a particular group of holes, a reference line is established against which the work pieces can be positioned prior to clamping and machining.

In accordance with the invention, the holes 30 are arranged in a repetitive pattern permitting pins to be alternately located so as to provide reference surfaces at a wide variety of commonly used angles. In the illustrated embodiment, the holes 30 are arranged in five rows in a pattern allowing stop pins inserted therein to provide reference surfaces varying in 15° steps from a base line. That is, any angle relative to the base line from zero to 180° that is divisible evenly by 15 can be selected simply by inserting stop pins in the proper group of holes. In the preferred arrangement, a base line 31 is selected that is transversely disposed relative to the main drive spindle 19 and which extends along one longitudinal edge of the work table 15.

In practicing the invention, a plurality of evenly spaced holes 32 are formed in a straight line along the base line 31 (see also FIG. 2). A second plurality of evenly spaced holes 33 is formed directly opposite the holes 32 along a line 34 which is parallel to the base line 31 and disposed at the opposite side of the table 15. As can be seen in FIG. 2, the holes 32, 33 are positioned so that lines 35 extending therebetween are perpendicular to the base line 31.

A third plurality of evenly spaced holes 36 are formed on a mid-line 37 that is parallel to the base line 31 and midway between the base line 31 and the opposite line 34 of the holes 33. The spacing of the holes 32 and 36 is such that lines 38 between any hole 36 and the nearest hole 32 meet the base line 31 at an acute angle of 60°.

The pattern of holes 30 also includes a fourth plurality of holes 39 located at the midpoints of a series of arcs connecting the holes 32, 33 and 36 and having a radius 43 equal to the distance between a hole 32 and one of the nearest holes 36. That is, the arcuate distance between the holes 39 and the nearest holes 33 and 36 is the same, and it can also be seen that the centers for the arcs 41 fall on the holes 36.

While the above described holes 32, 33, 36 and 39 form a complete pattern for purposes of the present invention, it is preferable to add an additional plurality of holes 45 located at the intersections of the lines 35 with the mid-line 37.

As a result of the above-described pattern, arranged in accordance with the invention, it will be noted that the stop pin holes 32, 33, 36, 39 and 45 are arrayed in five rows, including the base line 31, in a repetitive pattern, as can be best seen in FIG. 1. Despite the small number of stop pin holes embodied in this pattern, a very large selection of angles commonly employed in machine tool work can be conveniently established by inserting stop pins in the proper holes. The available angles, indicated by the letters A to K in FIG. 1, are as tabulated below:

| | |
|---|---|
| Angle A equals 15° | Angle G equals 105° |
| Angle B equals 30° | Angle H equals 120° |
| Angle C equals 45° | Angle I equals 135° |
| Angle D equals 60° | Angle J equals 150° |
| Angle E equals 75° | Angle K equals 165° |
| Angle F equals 90° | |

It will further be appreciated that most of the wide selection of angles listed above can be taken at any one of the base-line holes 32 because of the repetitive nature of the pattern embodying the invention.

Those skilled in the art will appreciate that a work piece supporting machine tool table embodying stop pin holes arranged in accordance with the invention need be no more expensive to manufacture than any conventional table having stop holes arrayed in simple rows and columns which would not provide the wide variety of angles achieved by the disclosed pattern. This economy results from the particular pattern embodying the invention which results in a large number of angles from a relatively few stop pin holes. The repetitive nature of the pattern makes the arrangement quite practical where the work pieces must be positioned at various points on the surface of the table for convenience in machining.

I claim as my invention:

1. In a machine tool, a work piece supporting table formed with a plurality of stop pin holes arranged in a pattern, said holes being adapted for removably receiving stop pins against which work pieces can be positioned, said pattern comprising a plurality of evenly spaced holes A alined in a straight line at one side of said table on a base line, a second plurality of evenly spaced holes B disposed directly opposite the holes A on a line parallel to said base line at the other side of said table, said opposite holes A and B being positioned so that lines therebetween are perpendicular to said base line, a third plurality of evenly spaced holes C disposed on a mid-line that is parallel to said base line and mid-way between said base line and said line of holes B, the spacing of said holes A and C being such that the line between any hole C and one of the nearest holes A meets said base line at an acute angle of 60°, and a fourth plurality of holes D positioned at the midpoints of a series of arcs connecting the holes A, B and C and having a radius equal to the distance between a hole C and one of the nearest holes A.

2. In a machine tool, a work piece supporting table formed with a plurality of stop pin holes arranged in a pattern, said holes being adapted for removably receiving stop pins against which work pieces can be positioned, said pattern comprising a plurality of evenly spaced holes A alined in a straight line at one side of said table on a base line, a second plurality of evenly spaced holes B disposed directly opposite the holes A on a line parallel to said base line at the other side of said table, said opposite holes A and B being positioned so that lines therebetween are perpendicular to said base line, a third plurality of evenly spaced holes C disposed on a mid-line that is parallel to said base line and mid-way between said base line and said line of holes B, the spacing of said holes A and C being such that the line between any hole C and one of the nearest holes A meets said base line at an acute angle of 60°, a fourth plurality of holes D positioned at the midpoints of a series of arcs connecting the holes A, B and C and having a radius equal to the distance between a hole C and one of the nearest holes A, and a fifth plurality of holes E positioned at the intersections of said mid-line with said lines between holes A and B.

3. In a machine tool, a work piece supporting table formed with a plurality of stop pin holes arranged in a pattern, said holes being adapted for removably receiving stop pins against which work pieces can be positioned, said pattern comprising a plurality of evenly spaced base line holes alined in a straight line at one side of said table on a base line, a second plurality of evenly spaced opposite holes disposed directly opposite the base line holes on a line parallel to said base line at the other side of said table, said opposite holes and said base line holes being positioned so that lines therebetween are perpendicular to said base line, a third plurality of evenly spaced mid-line holes disposed on a mid-line that is parallel to said base line and mid-way between said base line and said line of opposite holes, the spacing of said base line holes and mid-line holes being such that the line between any mid-line hole and one of the nearest base line holes meets said base line at an acute angle of 60°, and a fourth plurality of holes positioned at the midpoints of a series of arcs connecting the base line holes, the mid-line holes and said opposite holes and having a radius equal to the distance between a mid-line hole and one of the nearest base line holes.

References Cited in the file of this patent

UNITED STATES PATENTS

| | | |
|---|---|---|
| 2,147,800 | Sadowski | Feb. 21, 1939 |
| 2,336,541 | Gunter et al. | Dec. 14, 1943 |
| 2,508,837 | Peffers | May 23, 1950 |
| 2,963,946 | Muench | Dec. 13, 1960 |